H. A. JOHNS.
RESILIENT WHEEL.
APPLICATION FILED FEB. 21, 1922.

1,435,852.

Patented Nov. 14, 1922.
2 SHEETS—SHEET 1.

H. A. Johns
INVENTOR

BY Victor J. Evans
ATTORNEY

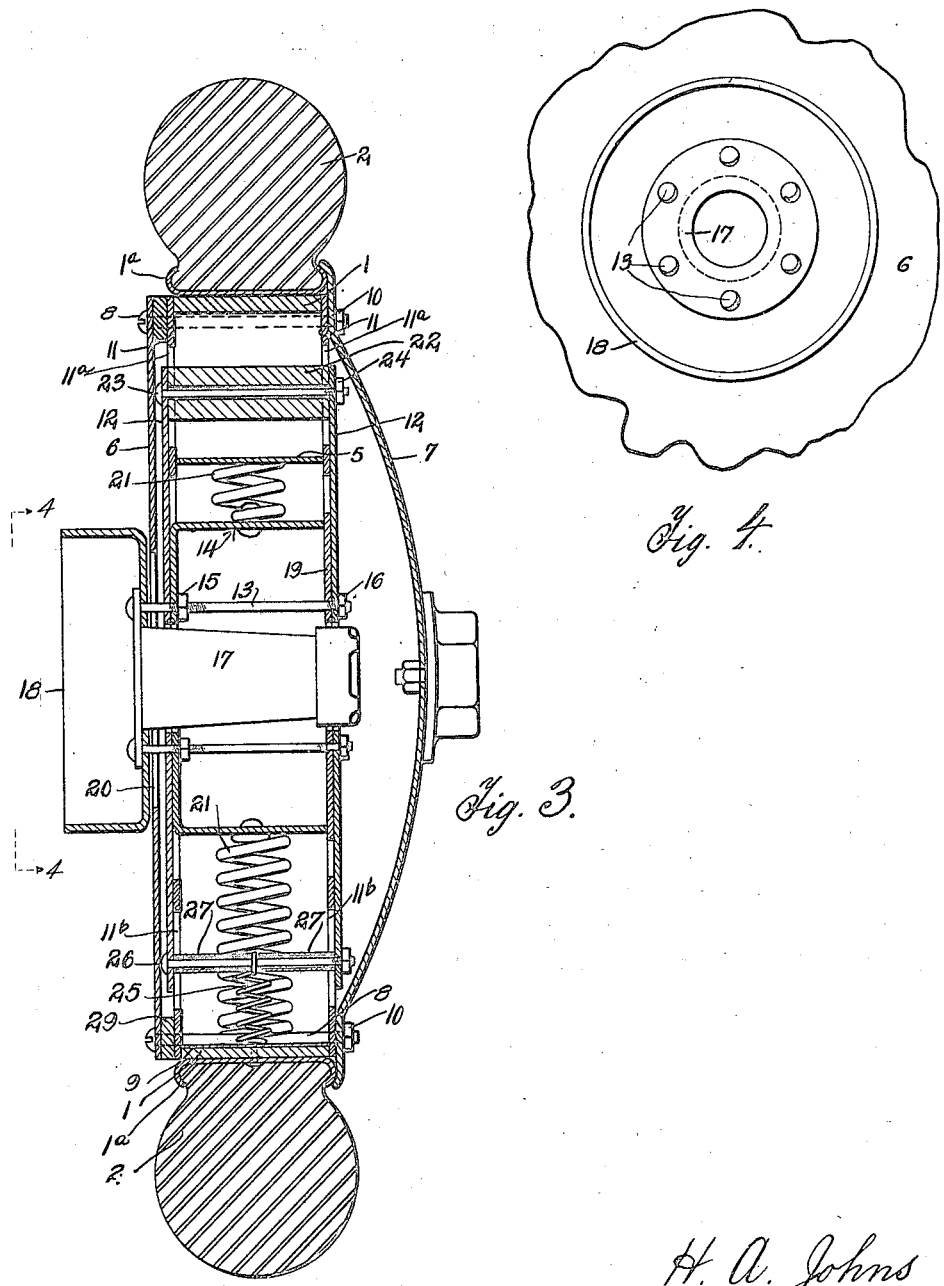

Patented Nov. 14, 1922.

1,435,852

UNITED STATES PATENT OFFICE.

HARRY A. JOHNS, OF DONORA, PENNSYLVANIA, ASSIGNOR OF ONE-HALF TO WILLIAM HOHN, OF DONORA, PENNSYLVANIA.

RESILIENT WHEEL.

Application filed February 21, 1922. Serial No. 538,374.

*To all whom it may concern:*

Be it known that I, HARRY A. JOHNS, a citizen of the United States, residing at Donora, in the county of Washington and State of Pennsylvania, have invented new and useful Improvements in Resilient Wheels, of which the following is a specification.

This invention relates to resilient wheels, and more particularly to a resilient wheel intended for use in connection with automobiles and similar vehicles.

One of the main objects of the invention is to provide a wheel of the character stated of simple construction and operation which possesses maximum resiliency and has the requisite strength to support the load to which it is subjected. A further object is to provide a wheel which can be produced at comparatively low cost and can be easily assembled. Further objects will appear from the detailed description.

In the drawings:—

Figure 3 is a section taken substantially on line 3—3 of Fig. 2;

Figure 4 is a fragmentary inner side view of the wheel taken substantially on line 4—4 of Fig. 3.

Figure 1:
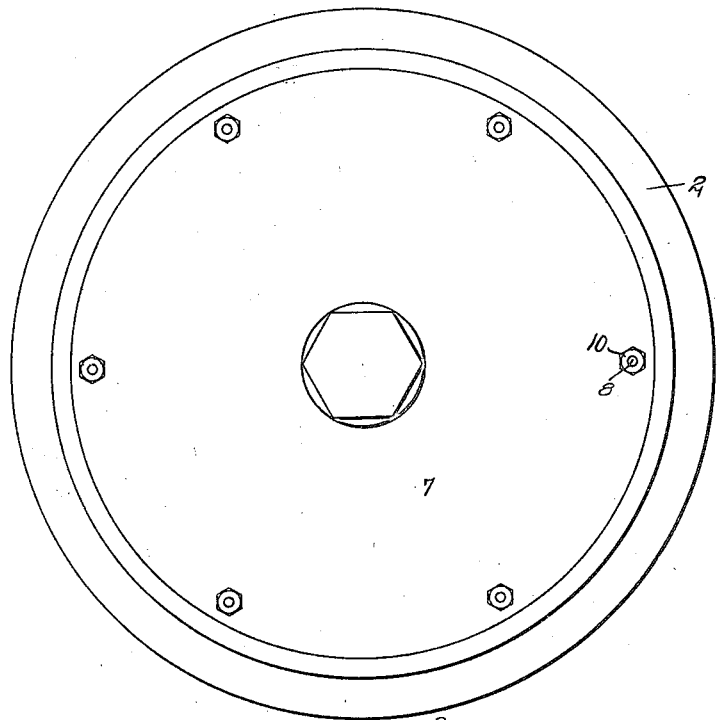
Figure 1 is a side view of the wheel.
Figure 2:
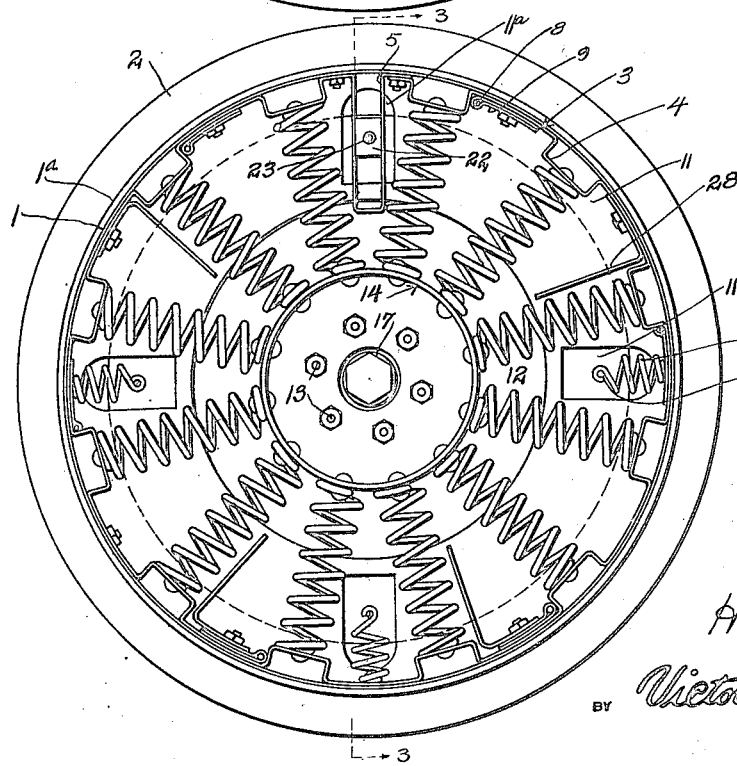
Figure 2 is a side view of the wheel with the plates removed.

The wheel includes an outer rim 1ª in which is mounted a solid rubber tire 2, this outer rim being mounted on a felly 1. A strip 3 is secured to the inner face of the felly 1 and is bent to provide substantially U-shaped securing elements 4. The strip is further bent to provide an inwardly projecting guide bracket 5 of substantially elongated U-shape which is disposed radially of the wheel. Inner and outer cover plates 6 and 7, respectively, are secured to the opposite sides of felly 1 by means of securing bolts 8 which pass through loops in straps 9 secured on the inner face of strip 3 adjacent to the securing elements 4, nuts 10 being threaded on these bolts. Annular supporting plates 11 are secured to the opposite sides of felly 1. Closure discs 12 are slidably mounted on the outer faces of plates 11, these discs being secured by bolts 13 to an inner drum 14 disposed concentric with felly 1 and positioned between the discs. The bolts 13 and nuts 15 and 16 also serve to secure a hub 17 to discs 12 and drum 14. In addition these bolts serve to secure a brake drum 18 to the hub and an inner closure disc 19 over the outer end of drum 14. Inner cover plate 6 is provided with an opening 20 surrounding hub 17 to permit movement of the hub radially of the wheel, and the discs 12 have radial movement on plates 11.

A plurality of coiled springs 21 radiate from drum 14 and have their inner ends secured to the drum, the outer ends of these springs being secured to the securing elements 4 of strip 3. A block 22 is secured between discs 12 by means of a bolt 23 and a nut 24, this block being slidable in guide bracket 5. To accommodate movement of the block radially of the wheel plates 11 are provided with openings 11ª. In addition to the springs 21 I provide three tension springs 25, which are secured at their outer ends to felly 1, the inner ends of these springs being secured to bolts 26 secured through discs 12, the plates 11 being provided with openings 11ᵇ to accommodate movement of the bolts. Preferably, though not necessarily, spacing sleeves 27 are positioned about bolts 26 and act to hold the discs 12 in spaced relation. The supporting plates 11 are held in spaced relation by angular spacing brackets 28 secured to the inner face of strip 3 and projecting inwardly therefrom. To permit freedom of movement of the discs 12 and associated parts a spacing ring 29 is positioned between inner cover plate 6 and plate 11.

The wheel shown is intended to be used on the rear of an automobile and when used as a front wheel the brake drum 18 may be omitted and replaced by a disc for covering the opening 20. The wheel constructed in the manner illustrated and described provides a floating mounting for the hub and has been found by experience to be very efficient and to effectually absorb shocks and jars incident to travel of the automobile.

What I claim is:—

1. In a resilient wheel, a central drum, a hub secured to the drum, a felly concentric with said drum, a securing strip secured on the inner face of the felly and bent to provide inwardly projecting securing elements, coil springs radiating from said drum and secured thereto at their inner ends, the outer ends of said springs being secured to said securing elements, and means for connecting the felly to the drum for rotation therewith.

2. In a resilient wheel, a drum, a hub secured thereto, a felly concentric with the drum, a strip secured on the inner face of the felly and bent to provide inwardly projecting securing elements and a guide bracket projecting inwardly from the felly and disposed radially of the wheel, coil springs having their inner ends secured to the drum and their outer ends secured to said securing elements, discs secured to the drum at the opposite sides thereof, and a block secured between said discs and slidable in said bracket.

3. In a resilient wheel, a drum, a hub secured thereto, a felly concentric with the drum, a strip secured on the inner face of the felly and bent to provide inwardly projecting securing elements and a guide bracket projecting inwardly from the felly and disposed radially of the wheel, coil springs having their inner ends secured to the drum and their outer ends secured to said securing elements, supporting plates secured to the felly at the opposite sides thereof and having central openings, closure discs slidably mounted on the outer faces of the plates, and a block secured between the discs and slidable in said bracket, the plates having openings to accommodate movement of the block.

4. In a resilient wheel, a drum, a hub secured thereto, a felly concentric with the drum, a strip secured on the inner face of the felly and bent to provide inwardly projecting securing elements and a guide bracket projecting inwardly from the felly and disposed radially of the wheel, coil springs having their inner ends secured to the drum and their outer ends secured to said securing elements, supporting plates secured to the felly at the opposite sides thereof and having central openings, closure discs slidably mounted on the outer faces of the plates, a block secured between the discs and slidable in said bracket, the plates having openings to accommodate movement of the block, tension springs secured at their outer ends to said felly, and bolts secured through said plates, the inner ends of the tension springs being secured to the bolts and the plates having openings to accommodate movement of the bolts, said tension springs acting in conjunction with the coil springs to normally hold the discs and drum concentric with said felly.

In testimony whereof I affix my signature.

HARRY A. JOHNS.